Patented Aug. 28, 1928.

1,682,240

UNITED STATES PATENT OFFICE.

WALTER A. PATRICK, OF BALTIMORE, MARYLAND, ASSIGNOR TO THE SILICA GEL CORPORATION, OF BALTIMORE, MARYLAND, A CORPORATION OF MARYLAND.

METHOD OF PREPARING STANNIC-OXIDE GELS.

No Drawing. Original application filed February 18, 1921, Serial No. 446,108. Divided and this application filed May 12, 1924. Serial No. 712,862.

The present application which is a division of my application 446,108 filed February 18, 1921, relates to a method of making an adsorbent and catalytic gel of stannic oxide.

In my Patent 1,297,724 for silica gel and process of making the same I disclosed and claimed a new method of producing hard porous highly adsorbent gels. The specific example mentioned in the patent is silica gel.

Prior to my patent the only known way of producing gels employed the slow and impractical step of dialysis. This was a laboratory method and would never have permitted the manufacture of gels in such quantities and cheap enough, so that they could be employed in the arts. My patent above mentioned describes how to avoid this step and manufacture gels cheaply and quickly so that they can be utilized in many fields.

The present invention relates to another species of the invention disclosed in the patent. More specifically, it is directed to a method of producing the gel of stannic oxide either as such or in combination with one or more of the oxides of aluminum, tungsten or titanium.

The principal object of the invention is to produce a gel of stannic oxide either alone or combined with other colloidal oxides possessing great adsorbing powers, and by a method which is commercially practicable.

For the method of the present invention, I carefully determine the concentrations of an acid solution and a solution of a soluble salt, such as a sodium salt of the acid of stannic oxide, such that when mixed, will set to a hydrogel within four or five hours after mixing. Great care must be exercised in bringing the acid and salt solutions together, in order to avoid a rapid coagulation. To prevent this coagulation it is necessary to vigorously stir the solutions at the moment of mixing. The amounts of the salt solution and the acid solution used are such as to give a final concentration of the H ions coming from the acid in the mixture varying between one-tenth and five-tenths mols per litre. The salt solution should preferably be of a concentration of from 3% to 7% by weight. Care should be taken to add the salt solution to the acid solution, or to bring them together simultaneously. If the acid solution is added to the salt solution the result will be a failure.

Thus for the production of stannic oxide gel, a 3% to 7% solution of sodium stannate is added to an acid solution, for example hydrochloric or sulphuric acids, until the concentration of the hydrogen ions coming from the acid in the mixture is from one-tenth to five-tenths mols per litre, and preferably about five-tenths mols per litre. The sodium stannate and acid solutions are thoroughly stirred at the time of mixing to prevent premature coagulation. The mixture sets to a hydrogel in a short time and is then broken into pieces and moisture removed as directed hereinafter.

The temperature of the solutions during the time of mixing and setting is an important factor in the time required for the setting of the hydrogel. At a temperature of about 50° C. the mixture sets to a hydrogel in thirty minutes to one hour and the product is just as good as the gel formed by mixing the solutions at a lower temperature but requiring a considerably longer time to set. Usually solutions at the time of mixing and at the time of setting are at atmospheric temperature but satisfactory results may be obtained at temperatures from 15° C. to 80° C. On mixing the acid and the soluble salt solutions, a colloidal solution of the acid corresponding to the oxide is first formed. It is from this solution that the compound sets to a hydrogel. The hydrogel which is formed by allowing the mixture to set is then broken into pieces and washed free from acid and salt. If the wash water is heated this step is expedited. The washed hydrogel must now have its moisture removed to obtain the hard gel. When this is effected by drying, it is essential that the water be removed slowly, as the resulting finely porous condition of the gel obtained depends upon the proper drying of the hydrogel. To this end the hydrogel is first dried in a stream of air at 75° C. to 120° C. After this heating the gel will still contain a considerable quantity of water and the greater part of this is driven off by increasing the temperature slowly up to 300° C. to 400° C. It may, however, be dried at 120° C. but this Aug. 28, 1928.                                                1,682,364
S. BALLANTINE ET AL
MAGNETIC CORE MATERIAL
Filed Jan. 9, 1923          2 Sheets-Sheet 1
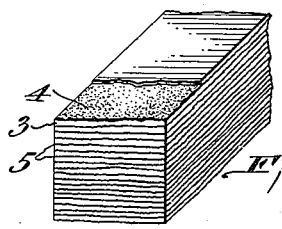
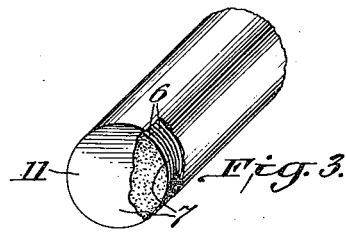
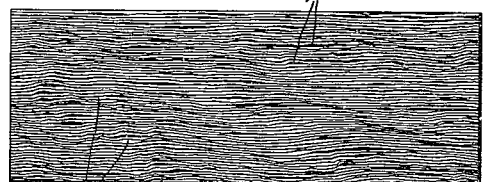
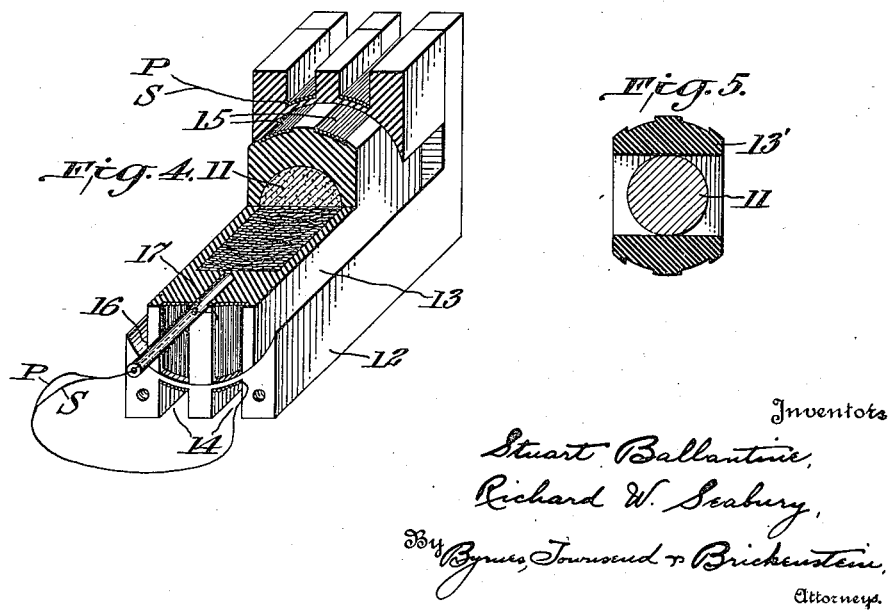

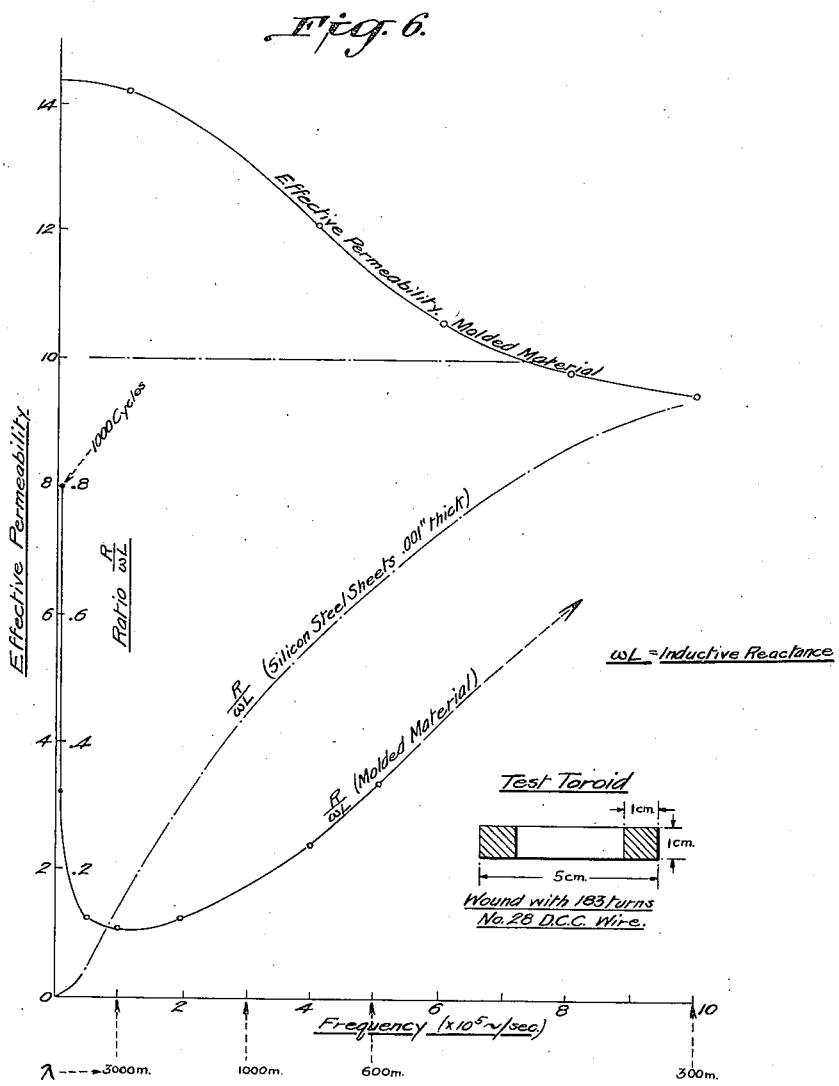

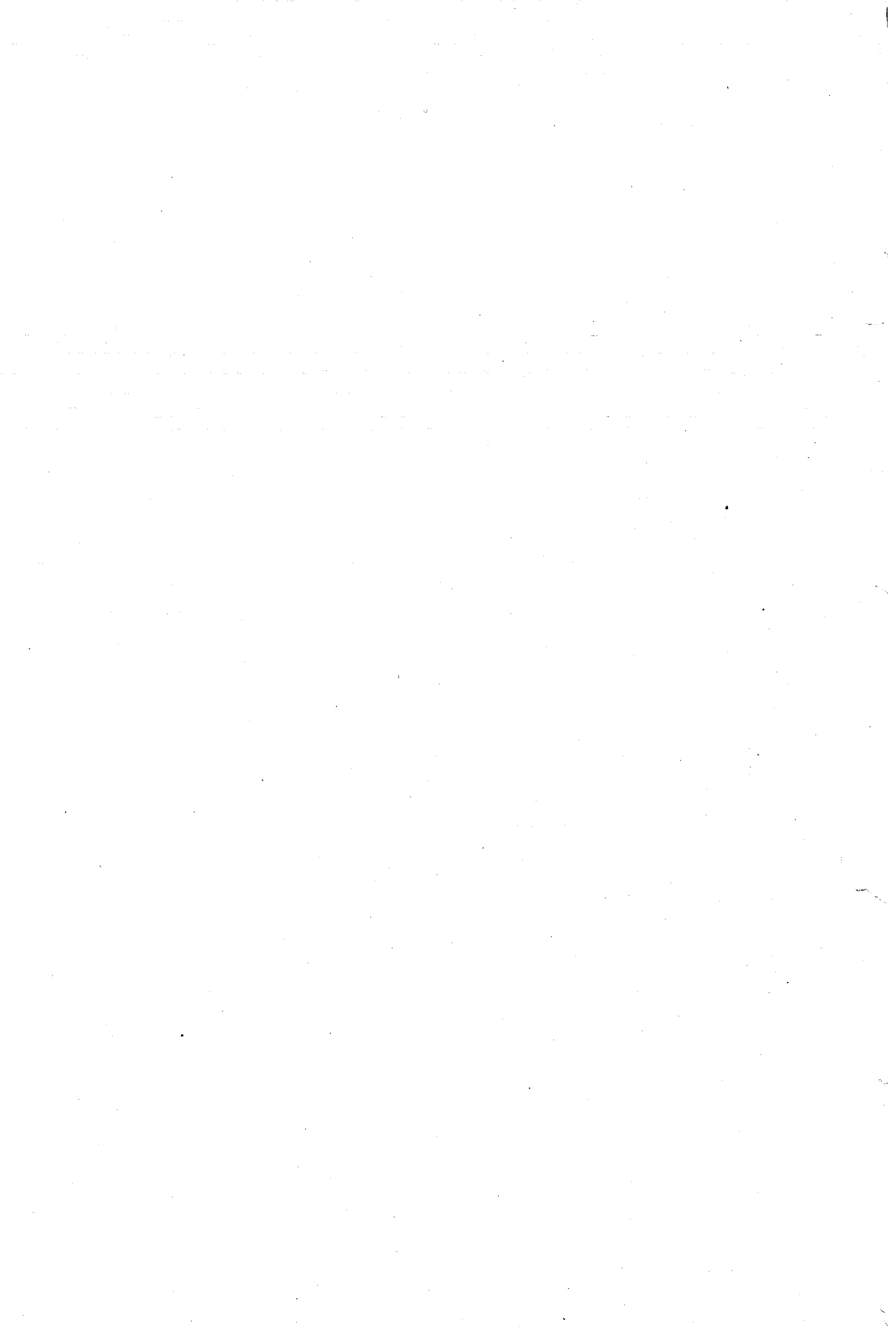

Patented Aug. 28, 1928.

1,682,364

UNITED STATES PATENT OFFICE.

STUART BALLANTINE AND RICHARD W. SEABURY, OF BOONTON, NEW JERSEY, ASSIGNORS TO RADIO FREQUENCY LABORATORIES, INC., OF BOONTON, NEW JERSEY, A CORPORATION OF NEW JERSEY.

MAGNETIC CORE MATERIAL.

Application filed January 9, 1923. Serial No. 611,671.

This invention relates to magnetic material which is particularly adapted for use at high frequencies.

An object of the invention is to provide a magnetic core which will have a high permeability when placed in a magnetic field set up by a current of high frequency. Another object of the invention is to provide a magnetic core which will increase the inductance of a winding associated with the core when the winding is traversed by a high-frequency current. A further object of the invention is to provide a laminated core of magnetic material in which the laminations are separated from and bonded to each other by a non-conducting binder. A further object of the invention is to provide a laminated core of the type stated in which the laminations are arranged in a predetermined manner in accordance with the particular properties which it may be desired to impart to a winding with which the core is to be associated. More specifically, an object of the invention is to provide a process for forming the laminated magnetic material into magnetic cores having a high effective permeability at high frequencies.

We have discovered that a superior material for magnetic cores may be formed by bonding laminations of magnetic material with a non-conducting binder, such as a phenolic resin, which serves the double purpose of insulating the laminations from each other and of bonding them into a compact and self-sustaining mass. The bonded material is particularly adapted for use at radio frequencies when the laminations take the form of thin sheets of oxidized silicon steel or of mill scale such as produced on silicon steel plates while undergoing heat treatment in the mill.

The laminations of the bonded material will usually take the form of substantially coplanar films, but this arrangement is not essential since the requirement that the magnetic field should be parallel to the laminations may be met by the use of films or sheets having the form of parallel surfaces such as would be generated by moving a straight line parallel to itself. Under certain circumstances it may be desirable to have a relatively large eddy current loss as might be the case when it is desired that the core and associated winding should have a stabilizing effect upon an electric circuit. In such a case the laminations are not bonded together in coplanar position, but are given all possible orientations with respect to a fixed direction. The eddy current loss with such a construction will be relatively high due to the haphazard arrangement of the laminations, and consequently the electrical resistance of a winding on the core will be increased. The eddy current loss, however, will be independent of the direction of the field, i. e. if a spherical core were symmetrically positioned within a winding, the adjustment of the core about its axis would not affect the eddy current loss.

The following example of one process for making a magnetic core and a statement of the properties of a core produced by such a process will illustrate the invention, but it is to be understood that the invention is not limited to the details set out in this example, nor to a core material having the specific properties recited: Mill scale from silicon steel transformer plates was bonded with a phenolic varnish (sp. gr. 0.900) prepared from a reactive phenolic resin and alcohol, at a pressure of approximately 10,000 pounds per square inch. The scale was coated with the varnish, dried for two hours at 100° C., and then placed in flat layers in steel dies. The mass was held at the pressure stated and at a temperature of 160° C. for ten minutes, then cooled for five minutes before removal from the molds. A toroid core of 1 cm. square cross-section and 5.1 cm. outside diameter when wound with 183 turns of No. 28 D. C. C. wire showed the following properties. The direct current resistance of the winding was 2.53 ohms and with an alternating current of 1000 cycles the resistance was 2.55 ohms, and the inductance was 512 microhenries. At 1000 cycles, the magnetic permeability of the core was 14.35; at approximately 70,000 cycles the permeability was 10 and at 100,000 cycles the permeability was approximately 9.5.

In the accompanying drawings which illustrate the magnetic core material and inductive coupling devices in which such material is employed, Fig. 1 illustrates a section through a core of bonded mill scale as viewed under a high power microscope, Figs. 2 and 3 are perspective views of different forms of cores, Fig. 4 is a perspective view, partly in sec-